United States Patent
Watanabe

(10) Patent No.: US 11,479,271 B2
(45) Date of Patent: Oct. 25, 2022

(54) DRIVING ASSIST DEVICE, METHOD AND PROGRAM

(71) Applicant: TOYOTA JIDOSHA KABUSHIKI KAISHA, Toyota (JP)

(72) Inventor: Kosuke Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 16/944,217

(22) Filed: Jul. 31, 2020

(65) Prior Publication Data

US 2021/0139049 A1 May 13, 2021

(30) Foreign Application Priority Data

Nov. 8, 2019 (JP) .............................. JP2019-203252

(51) Int. Cl.
*B60W 60/00* (2020.01)
*B60W 40/09* (2012.01)

(52) U.S. Cl.
CPC ........ *B60W 60/0051* (2020.02); *B60W 40/09* (2013.01); *B60W 60/0016* (2020.02); *B60W 2540/043* (2020.02)

(58) Field of Classification Search
CPC ............. B60W 60/0051; B60W 40/09; B60W 60/0016; B60W 2540/043; B60W 60/0018; B60W 60/007; B60W 2554/408; B60W 40/08; B60W 10/06; B60W 10/18; B60W 10/20; B60W 30/08; B60W 30/12; B60K 28/02
See application file for complete search history.

(56) References Cited

U.S. PATENT DOCUMENTS

| 2013/0211618 A1 | 8/2013 | Iachini | |
| 2018/0297518 A1* | 10/2018 | Armitage | ............... G07C 5/008 |
| 2019/0031097 A1* | 1/2019 | O'Herlihy | ............... B60Q 9/00 |
| 2020/0050194 A1* | 2/2020 | Choi | ................... G05D 1/0061 |

FOREIGN PATENT DOCUMENTS

| JP | 2005-023916 A | 1/2005 |
| JP | 2007-331652 | 12/2007 |
| JP | 2009-205645 | 9/2009 |
| JP | 2011-081570 | 4/2011 |
| JP | 2013-152540 | 8/2013 |
| JP | 2013-164831 A | 8/2013 |
| JP | 2015-041120 A | 3/2015 |
| JP | 2018-037002 A | 3/2018 |
| WO | WO2014/016911 A1 | 1/2014 |

\* cited by examiner

*Primary Examiner* — Alan D Hutchinson
(74) *Attorney, Agent, or Firm* — Oblon, McClelland, Maier & Neustadt, L.L.P.

(57) ABSTRACT

A driving assist device is mounted on a vehicle. The driving assist device includes a derivation unit that derives driving characteristics of a user who drives the vehicle, a determination unit that determines, based on the driving characteristics, whether a driving operation by the user corresponds to a driving operation that falls outside the driving characteristics, and an inhibition unit that performs, in a case where the determination unit determines that the driving operation by the user corresponds to a driving operation that falls outside the driving characteristics, control for inhibiting traveling based on the driving operation by the user.

13 Claims, 6 Drawing Sheets

DRIVING ASSIST DEVICE, METHOD AND PROGRAM

CROSS-REFERENCE TO RELATED APPLICATION

This application claims priority to Japanese Patent Application No. 2019-203252 filed on Nov. 8, 2019, incorporated herein by reference in its entirety.

BACKGROUND

1. Technical Field

The present disclosure relates to a driving assist device mounted on, for example, a vehicle.

2. Description of Related Art

A user who drives a vehicle is required to have an ability to drive without making a mistake.

Japanese Unexamined Patent Application Publication No. 2005-023916 (JP 2005-023916 A) discloses an accelerator operational failure warning system. In this accelerator operational failure warning system, it is determined, from a current location detected by a car navigation device and map data, whether a road surface on which the vehicle is traveling is downhill or uphill. In a case where the current location is downhill and an accelerator opening is larger than a predetermined value, or in a case where the current location is uphill and the accelerator opening is smaller than the predetermined value, it is determined that the accelerator has been inappropriately operated. Furthermore, a vehicle speed change rate from immediately prior to the present and a current vehicle speed change rate are measured, and in a case where an absolute value of a difference between the current vehicle speed change rate and the vehicle speed change rate from immediately before to the present is a predetermined value, it is determined that the accelerator has been inappropriately operated, whereby a warning is issued to the user.

Moreover, Japanese Unexamined Patent Application Publication No. 2015-41120 discloses a vehicle driving assist device. In this vehicle driving assist device, driving characteristic diagnosis data indicating the driving characteristics of the vehicle by the user is generated and stored. Based on such data, a driving assist message is updated, generated and output before the driving is started.

Additionally, Japanese Unexamined Patent Application Publication No. 2013-164831 discloses a method of characterizing driving of the user. In such a method, a driver's risk when driving is evaluated based on information such as a travel distance of the vehicle driven by the user, a kind of traveling path, and acceleration/deceleration.

SUMMARY

Determination of and measures for when a user loses his/her concentration while driving a vehicle and when the user is performing a driving operation that is different from usual may be improved.

The present disclosure is intended to address such a shortcoming, and an object of the present disclosure is to provide a driving assist device capable of taking suitable measures when the user is performing a driving operation that is different from usual.

In order to address such a shortcoming, one aspect of the present disclosure is a driving assist device mounted on a vehicle. The driving assist device includes a derivation unit that derives driving characteristics of a user who drives the vehicle, a determination unit that determines, based on the driving characteristics, whether a driving operation by the user corresponds to a driving operation that falls outside the driving characteristics, and an inhibition unit that performs, in a case where the determination unit determines that the driving operation by the user corresponds to a driving operation that falls outside the driving characteristics, control for inhibiting traveling based on the driving operation by the user.

With the present disclosure, it is possible to provide a driving assist device which derives the driving characteristics of the user, determines, based on the driving characteristics, a driving operation that falls outside the driving characteristics, and inhibits, in a case where the driving operation actually falls outside the driving characteristics, traveling based on such a driving operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments

Hereinafter, embodiments of the present disclosure will be described with reference to drawings. The driving assist device according to the present embodiment derives driving characteristics of a user and determines whether a driving operation of the user falls outside the driving characteristics. In particular, the better the driving characteristics of the user, the easier it is to determine that the driving operation falls outside the driving characteristics. Accordingly, a state in which the user's concentration is lower than usual can be detected more accurately. Further, when a driving operation falling outside the driving characteristics is carried out, a process of inhibiting traveling by the driving operation of the user is performed.

Configuration

Figure 1:
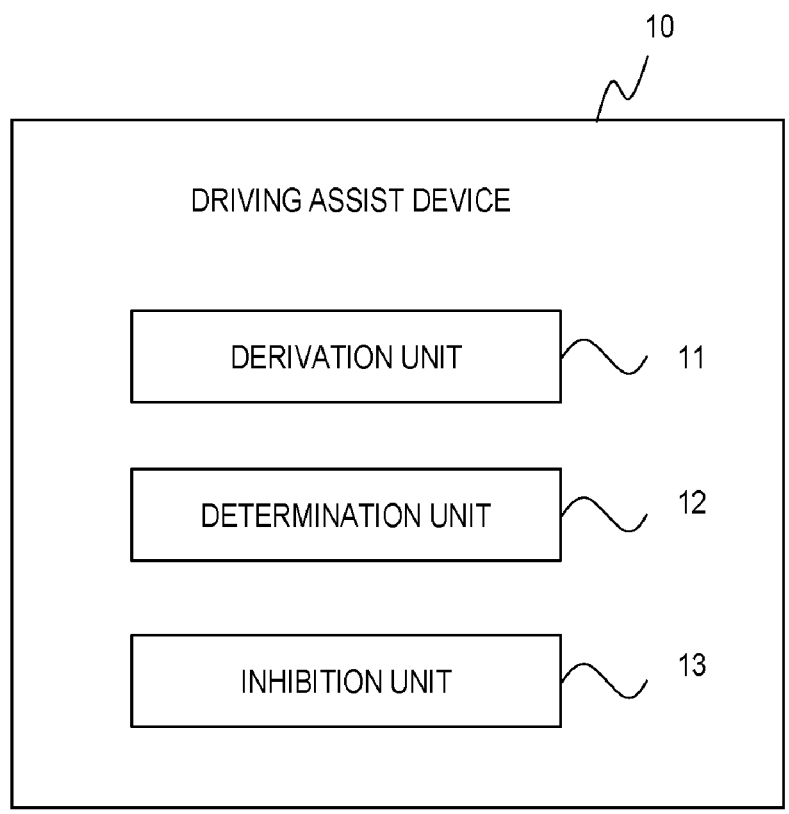
FIG. 1 is a functional block diagram of a driving assist device according to one embodiment of the present disclosure.

FIG. 1 shows a functional block of a driving assist device 10 according to the present embodiment. The driving assist device 10 includes a derivation unit 11 that derives driving characteristics of the user who is a driver, a determination unit 12 that determines whether a driving operation of the user corresponds to a driving operation that falls outside the driving characteristics, and an inhibition unit 13 that controls such that, in a case where the determination unit 12 determines that the driving operation corresponds to a driving operation falling outside the driving characteristics, traveling based on such a driving operation by the user is inhibited.

Figure 2:
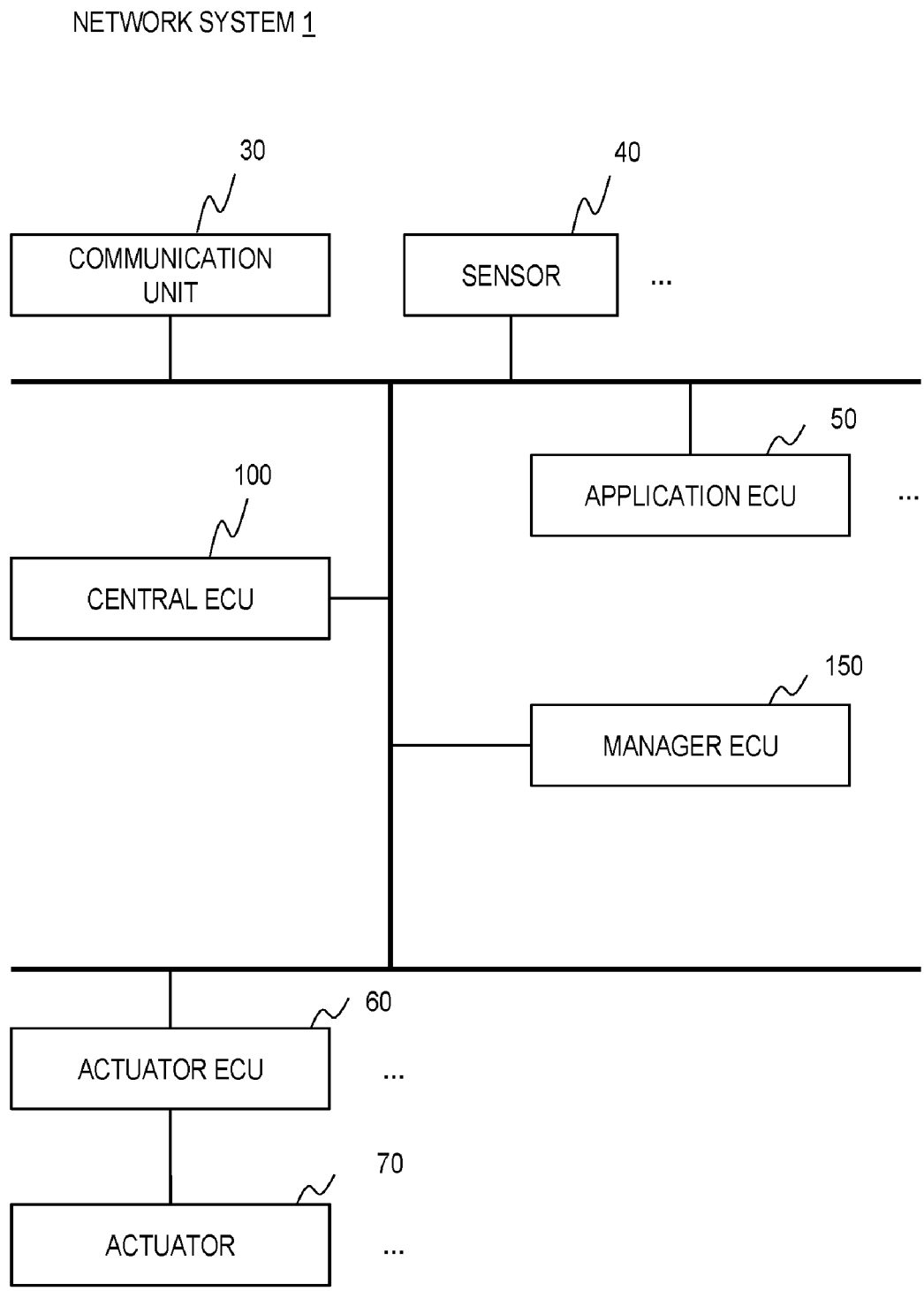
FIG. 2 is a conceptual diagram of an in-vehicle network system according to the embodiment of the present disclosure.

FIG. 2 shows a configuration diagram of an in-vehicle network system 1. As one example, functions of the driving assist device 10 are distributed and implemented as a part of each function of an electronic control unit (ECU) called a central ECU 100 and a manager ECU 150. For example, the derivation unit 11 and the determination unit 12 may be provided in the central ECU 100, and the inhibition unit 13 may be provided in a distributed manner in the central ECU 100 and the manager ECU 150. The network system 1 may include, for example, a communication unit 30 that can wirelessly communicate with a server outside the vehicle or another vehicle, a plurality of sensors 40 that acquires a state of the vehicle or the surroundings of the vehicle, a plurality of actuator ECUs 60 that respectively controls a plurality of actuators 70 such as an actuator of an engine, an actuator of a brake or an actuator of power steering, and one or more application ECUs 50 that provide various functions, which are connected to each other and also connected to the central ECU 100 and the manager ECU 150.

Each of the application ECUs 50 is an ECU that individually performs control for various functions, such as parking assistance, collision avoidance, and lane keeping in accordance with instructions from the user. Further, the central ECU 100 is a relatively high-function ECU, and is capable of performing comprehensive, common, or basic vehicle control better than the application ECU 50. The application ECU 50 and the central ECU 100 generate instructions to control the actuator 70 based on information received from the server outside the vehicle or another vehicle via the communication unit 30, and various information including the driving operation of the user acquired from, for example, the sensor 40.

The manager ECU 150 receives the instructions generated by the application ECU 50 and the central ECU 100, and performs arbitration which is a process of determining optimal instruction to control the actuator 70 based on the instruction details and the priority associated with the instruction. The manager ECU 150 also generates an instruction for the actuator ECU 60 based on the arbitration result.

The actuator ECU 60 is an ECU that individually controls the actuator 70, receives the instruction generated by the manager ECU 150, and controls the actuator 70 based on the instruction. The actuator ECU 60 can provide the manager ECU 150 with necessary information such as an operation state of the actuator 70 when the manager ECU 150 generates the instruction.

Each of the ECUs stated above is typically a computer including a processor and a memory.

Process

The process executed by each unit of the driving assist device 10 according to the present embodiment will be described below.

Driving Characteristics Derivation Process

This process is a process performed by the derivation unit 11 that derives and updates the driving characteristics representing the driving tendencies of the user.

First, an outline of variables mainly used in this process will be described. Each variable is a mere example and is not limited thereto.

A static parameter is a user attribute value that is not based on the actual driving operation of the user, but is considered to have a certain correlation with the driving characteristics. In this specification, two static parameters are exemplified as $P_{s1}$ (user's age) and $P_{s2}$ (user's driving history (the number of years that he/she has driven the vehicle)).

A dynamic parameter is a value derived based on the actual driving operation of the user. Here, the dynamic parameters are exemplified as $P_{d1}$ (a value representing cooperativeness with the vehicles around the user) and $P_{d2}$ (a value representing appropriateness of the driving operation).

Among the dynamic parameters, the cooperativeness $P_{d1}$ is a value that represents a degree to which the user's vehicle does not influence the traffic flow, pedestrians, and the like around the vehicle. The smaller the degree of influence is, the larger the value of cooperativeness $P_{d1}$ is.

Among the dynamic parameters, the appropriateness $P_{d2}$ is derived based on a time period from when a situation in which a vehicle state needs to be changed occurs to when the user performs the driving operation for causing such a change. The vehicle state may be, for example, the speed of the vehicle or a steering angle of a steering wheel. Such a time period can be exemplified as a time period from, while the vehicle is traveling, when the nearest traffic lights within a predetermined distance in front of the vehicle change from green to yellow and thus the vehicle needs to be stopped, to when the user operates the brake pedal so as to stop the vehicle. Consequently, the appropriateness $P_{d2}$ is determined based on required agility of a quick driving operation required in accordance with a traveling scene. The value of the appropriateness $P_{d2}$ increases as the driving operation is evaluated to have higher agility.

The driving characteristics are a set ($D_{c1}$, $D_{c2}$) of a value $D_{c1}$ indicating cooperativeness and a value $D_{c2}$ indicating reactivity in the normal driving operation of the user.

Among the driving characteristics, as the cooperativeness $D_{c1}$, the cooperativeness $P_{d1}$ included in the dynamic parameter is used as it is.

Among the driving characteristics, the reactivity $D_{c2}$ is derived based on the age $P_{s1}$ and the driving history $P_{s2}$, which are included in the static parameters, as well as the appropriateness $P_{d2}$ included in the dynamic parameters. The value of the reactivity $Dc_2$ increases as the driving operation is evaluated to have higher agility.

A specific method of deriving the dynamic parameters and the driving characteristics will be described below.

Figure 3:
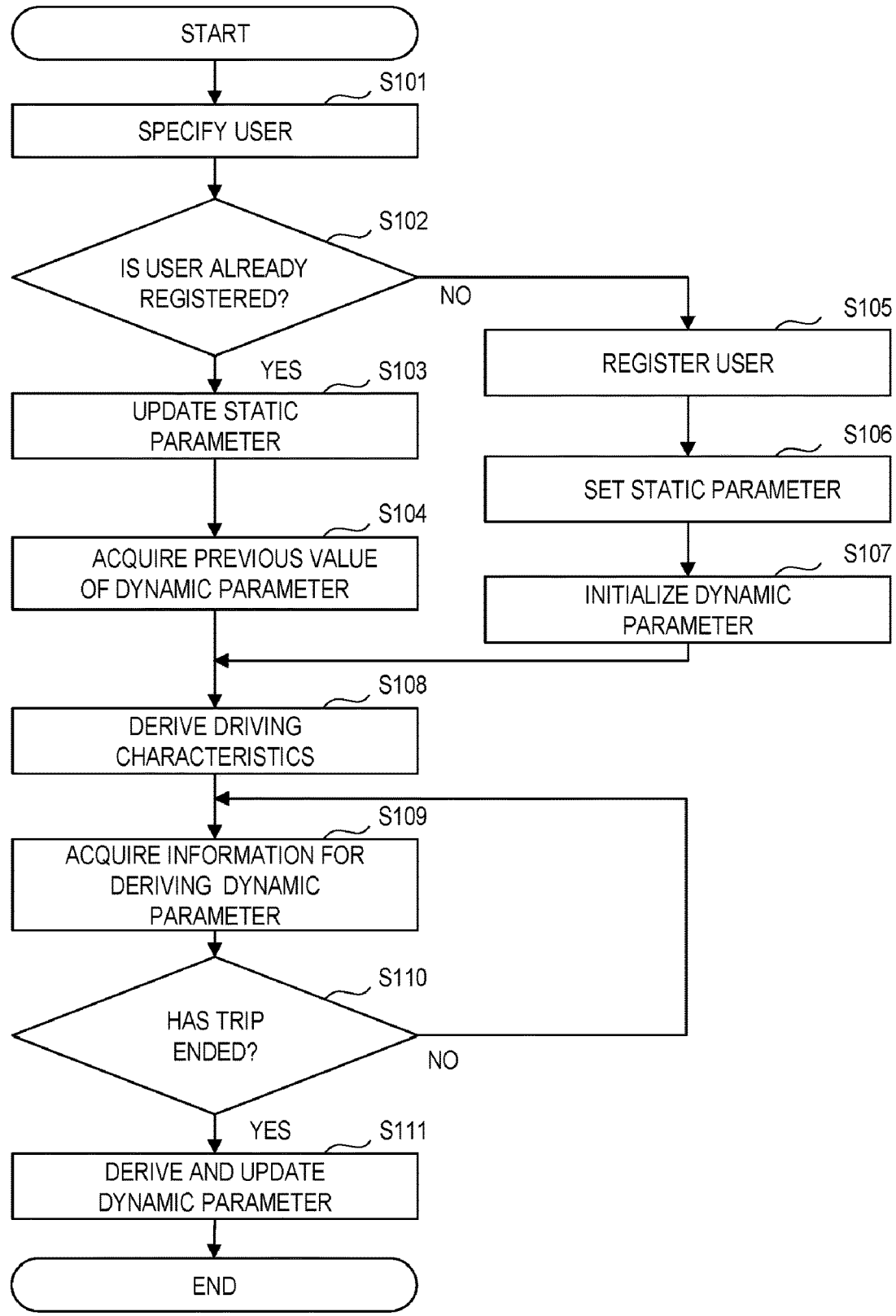
FIG. 3 is a flowchart illustrating a driving characteristics derivation process according to the embodiment of the present disclosure.

The driving characteristics derivation process will be described with reference to the flowchart shown in FIG. 3. This process is started when the vehicle is turned on and a new trip is started.

(Step S101): The derivation unit 11 identifies the user who is the driver. The specific method is not limited, but for example, designation of, for example, a name may be accepted from the user and specified, and an identifier of an electronic key carried by the user may be used to specify the user associated with the electronic key.

(Step S102): The derivation unit 11 determines whether the user identified in step S101 is a user who has already been registered as a target of deriving the driving characteristics. For example, the derivation unit 11 stores a table containing records for each registered user, and if a record corresponding to the specified user is in the table, it can be determined that registration has been completed. If the user is already registered, the process proceeds to step S103, and if not registered, the process proceeds to step S105. In this table, the static parameters $P_{s1}$, $P_{s2}$ and the dynamic parameters $P_{d1}$, $P_{d2}$ can be set for each user's record.

(Step S103): The derivation unit 11 updates the static parameters $P_{s1}$, $P_{s2}$ of the user. The derivation unit 11 updates the parameters in a case where the static parameters change. In this example, according to the number of days elapsed since the previous update, for example every one year, the age and the driving history in the record corresponding to the user are added and updated.

(Step S104): The derivation unit 11 acquires the dynamic parameters $P_{d1}$, $P_{d2}$ of the user as previous values from the table. Thereafter, the process proceeds to step S108. Moreover, a method of deriving the dynamic parameters $P_{d1}$, $P_{d2}$ will be described below.

(Step S105): The derivation unit 11 registers the user. Registration can be carried out by creating a new record for the user.

(Step S106): The derivation unit 11 sets the static parameters $P_{s1}$, $P_{s2}$ of the user. This step is performed, for example, by accepting input of the static parameters $P_{s1}$, $P_{s2}$ from the user and setting the parameters in the record corresponding to the user.

(Step S107): The derivation unit 11 initializes the dynamic parameters $P_{d1}$, $P_{d2}$ of the user. This step is performed, for example, by provisionally setting a value defined as an initial value in the record corresponding to the user.

(Step S108): The derivation unit 11 derives the driving characteristics ($D_{c1}$, $D_{c2}$) of the user. The driving characteristics derived in this step are used for the determination process in this trip, which will be described below. The cooperativeness $D_{c1}$ uses the dynamic parameter cooperativeness $P_{d1}$. A method of deriving the reactivity $D_{c2}$ will be described below. First, a value map ($P_{s1}$, $P_{s2}$) corresponding to the set of static parameters $P_{s1}$, $P_{s2}$ is acquired based on a predetermined map. An example of the map is shown below:

TABLE 1

|  |  | $P_{s2}$ (Driving History) | | | |
| --- | --- | --- | --- | --- | --- |
|  |  | 1 or less | 2 | From 3 to 9 | 10 or more |
| $P_{s1}$ (Age) | 80 or older | 1 | 1 | 2 | 3 |
|  | From 70 to 79 | 3 | 4 | 5 | 5 |
|  | From 60 to 69 | 5 | 6 | 7 | 8 |
|  | From 50 to 59 | 8 | 9 | 10 | 10 |
|  | From 40 to 49 | 8 | 9 | 10 | 10 |
|  | From 30 to 39 | 8 | 9 | 10 | 10 |
|  | From 20 to 29 | 8 | 9 | — | — |
|  | From 10 to 19 | 8 | — | — | — |

In the map stated above, the younger the age or the longer the driving history is, the larger the value indicating higher reactivity. The kind and number of static parameters are not limited, and the parameters may include, for example, only age or only driving history, or any attribute may be adopted as long as it is statistically significant.

The value $D_{c2}$ representing the reactivity is derived by the following Equation 1:

[Equation 1]

$$D_{c2} = W_S \times Map(P_{S1}, P_{S2}) + W_d \times P_{d2} \quad (1)$$

Herein, $W_s$ and $W_d$ are, respectively, positive weighting coefficients. The reactivity is considered to be related to the static parameters, and the map ($P_{s1}$, $P_{s2}$) is derived based on the static parameter. In this example, as the driving characteristics, the cooperativeness $D_{c1}$ uses the cooperativeness $P_{d1}$ which is a dynamic parameter without changing, while the reactivity $D_{c2}$ is derived by combining the map ($P_{s1}$, $P_{s2}$) determined by the static parameters $P_{s1}$, $P_{s2}$ and the appropriateness $P_{d2}$ of the dynamic parameters by weighted addition.

(Step S109). When the vehicle starts traveling, the derivation unit 11 acquires information for updating the dynamic parameters $P_{d1}$, $P_{d2}$ used in the next trip. Specifically, the derivation unit 11 acquires surrounding traffic flow information from the server or another vehicle via the communication unit 30. The surrounding traffic flow is information indicating a traveling state of surrounding vehicles, which are vehicles traveling on the same road as the user's vehicle within a certain range of the user's vehicle.

Further, the derivation unit 11 acquires speed of the host vehicle from a vehicle speed sensor or the like, from among the sensors 40. The derivation unit 11 periodically stores, for example, a set of the speed of the host vehicle and the speed of the surrounding traffic flow, which is an average value of the speed of the surrounding vehicles obtained from the surrounding traffic information. If the surrounding traffic flow information cannot be acquired due to a temporary deterioration of the communication state, it is not necessary to store the set of the speed of the host vehicle and speed of the surrounding traffic flow.

Further, the derivation unit 11 detects a fact that a traveling scene is started in which a quick driving operation is required. For example, in a case where the nearest traffic lights within a first distance ahead of the vehicle change from green to yellow while the vehicle is traveling, such a scene corresponds to a scene in which the vehicle should be stopped by operating the brake pedal. Further, in a case where another vehicle cuts in front of the vehicle from the adjacent lane within a second distance ahead of the vehicle while the vehicle is traveling, such a scene corresponds to a scene in which the vehicle should be decelerated by operating the brake pedal. Such a scene can be detected by a camera, a distance sensor using light or electromagnetic waves, or the like, from among the sensors 40. The derivation unit 11 measures and stores a reaction time period, which is a time period from when the scene is started to when the driving operation defined as the driving operation required to the user according to the scene is performed. The driving operation of the user can be detected by the brake pedal sensor, the accelerator opening sensor, or the like, from among the sensors 40.

Since the driving operation of the user does not have to be evaluated during the autonomous driving or various driving assist functions, it is not necessary to acquire, measure, or store such various information.

(Step S110): The derivation unit 11 determines whether the trip has ended. For example, it can be determined that the trip has ended by detecting that a power supply of the vehicle has been turned off. If the trip ends, the process proceeds to step S111, and otherwise, the process proceeds to step S109.

(Step S111): The derivation unit 11 newly derives the dynamic parameters $P_{d1}$, $P_{d2}$ based on the information stored in step S109. The previous value is updated by the dynamic parameters $P_{d1}$, $P_{d2}$ derived in this step, and used for the determination process in the next trip. The method of deriving the dynamic parameters $P_{d1}$, $P_{d2}$ will be described below.

A method of deriving the cooperativeness $P_{d1}$ among the dynamic parameters will be described. The derivation unit 11 acquires a correlation coefficient between the speed of the host vehicle and the speed of the surrounding traffic flow based on the stored multiple sets of the speed samples of the host vehicle and the surrounding traffic flow. This correlation coefficient is referred to as the cooperativeness $P_{d1}$. That is, $P_{d1}$ is a value of −1 or more and 1 or less. The larger the value is, the more the acceleration/deceleration tendency of the host vehicle matches the acceleration/deceleration tendency of the surrounding vehicle, and thus it can be determined that the user's driving has high cooperativeness. The cooperativeness $P_{d1}$ is not the correlation coefficient between the speed of the host vehicle and the speed of the surrounding traffic flow, but may be a correlation coefficient of an inter-vehicle distance between the host vehicle and the front, rear, left, and right vehicles, and a vehicle-to-vehicle distance between each surrounding vehicle and the front, rear, left, and right vehicles. Consequently, the cooperativeness $P_{d1}$ is derived from some degree of similarity between the host vehicle and the surrounding vehicles.

A method of deriving the appropriateness $P_{d2}$ among the dynamic parameters will be described. When the number of the reaction times stored in the derivation unit 11 is N, $P_{d2}$ is derived by the following Equation 2 based on the N samples $t_1, t_2, \ldots, t_N$:

[Equation 2]

$$P_{d2} = \frac{1}{N}\sum_{i=1}^{N} val_i \quad (2)$$

Herein, $val_i$ is derived by the following Equation 3 with $val_{max}$ (>0) and T (>0) as constants for each i (=1, 2, ..., N):

[Equation 3]

$$val_i = \begin{cases} val_{max} \times \dfrac{T - t_i}{T} & \text{(when } 0 \le t_i \le 2T) \\ -val_{max} & \text{(when } 2T \le t_i) \end{cases} \quad (3)$$

$P_{d2}$ is a value of $-val_{max}$ or more and $val_{max}$ or less, and it can be determined that the higher the value is, the higher the reactivity of the user is in driving.

The derivation unit 11 updates the record based on the previous value and the currently derived value, of the dynamic parameter. When the previous value and the currently derived value of $P_{d1}$ are referred to as $P_{d1\_prev}$ and $Pd_{d1\_ct}$, respectively, the updated value $P_{d1\_ud}$ is derived by the following Equation 4 with $W_1$ as a positive weighting coefficient:

[Equation 4]

$$P_{d1\_ud} = \frac{P_{d1\_prev} + W_1 \times P_{d1\_ct}}{1 + W_1} \quad (4)$$

Further, when the previous value and the current derived value of $P_{d2}$ are referred to as $P_{d2\_prev}$ and $P_{d2\_ct}$, respectively, the updated value $P_{d2\_ud}$ is derived by the following Equation 5 with $W_2$ as a positive weighting coefficient:

[Equation 5]

$$P_{d2\_ud} = \frac{P_{d2\_prev} + W_2 \times P_{d2\_ct}}{1 + W_2} \quad (5)$$

Consequently, it is possible to generate the dynamic parameters that reflect recent changes while using past values by updating the dynamic parameters using both the previous value and the currently derived value. The driving characteristics derivation process ends.

Determination Process

Figure 4:
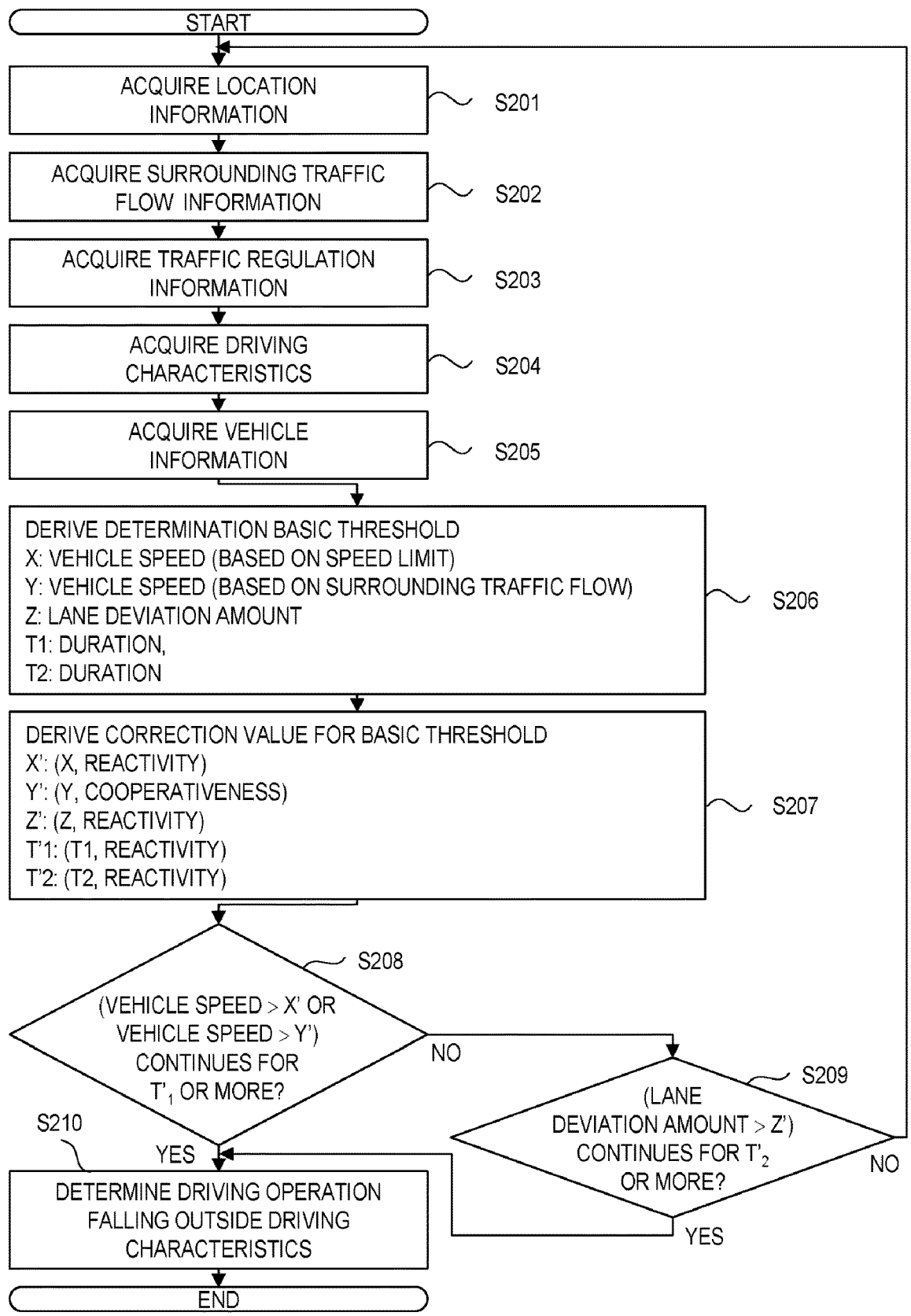
FIG. 4 is a flowchart illustrating a determination process according to the embodiment of the present disclosure.

This process is a process executed by the determination unit 12 that determines whether the driving operation of the user corresponds to a driving operation falling outside the driving characteristics. The process will be described with reference to the flowchart shown in FIG. 4. This process is executed independently of the driving characteristics derivation process described above when the driving operation is performed by the user, and the determination is made based on the driving characteristics of the user and the traveling state of the host vehicle depending on the driving operation of the user.

(Step S201): The determination unit 12 acquires location information of the host vehicle. The location information can be acquired by a GPS sensor or the like, from among the sensors 40.

(Step S202): The determination unit 12 acquires the surrounding traffic flow information.

(Step S203): The determination unit 12 acquires traffic regulation information. The traffic regulation information is obtained by reading a sign using a camera or the like, from among the sensors 40, or by referring to map information stored in a navigation system, or regulation information received from the server or the like according to the location information of the host vehicle.

(Step S204): The determination unit 12 acquires the driving characteristics derived in step S108 of the driving characteristics derivation process described above. In a case where the driving characteristics have not been derived, the process is paused until they are derived.

(Step S205): The determination unit 12 acquires vehicle information. In this example, as the vehicle information, various sensors 40 are used to acquire a traveling state of the host vehicle such as speed, acceleration or yaw angle, a traveling scene in which the host vehicle is running or stopped, or is operated to be started or stopped, and a lane deviation amount.

(Step S206): The determination unit 12 derives a basic threshold used for the determination. The basic threshold is vehicle speed X determined based on a speed limit obtained from the traffic regulation information, vehicle speed Y determined based on the speed of the surrounding traffic flow from the surrounding traffic flow information, and a lane deviation amount Z determined based on the lane width, first duration $T_1$ and second duration $T_2$. Further, these basic thresholds may be determined based on the traveling scene.

(Step S207): The determination unit 12 corrects the basic threshold using the driving characteristics of the user. One example of the correction will be described.

The determination unit 12 corrects the vehicle speed X using the reactivity $D_{c2}$ which is the driving characteristic. Specifically, the corrected vehicle speed X' is derived by the following Equation 6 using a positive correction coefficient A and a reactivity standard value $D_{c2\_st}$:

[Equation 6]

$$X' = X - A(D_{c2} - D_{c2\_st}) \quad (6)$$

The determination unit 12 corrects the vehicle speed Y using the cooperativeness $D_{c1}$ which is the driving characteristic. Specifically, the corrected vehicle speed Y' is derived by the following Equation 7 using a positive correction coefficient B and a cooperativeness standard value $D_{c1\_st}$:

[Equation 7]

$$Y'=Y-B(D_{c1}-D_{c1\_st}) \quad (7)$$

The determination unit 12 corrects the lane deviation amount Z using the reactivity $D_{c2}$ which is the driving characteristic. Specifically, the corrected lane deviation amount Z' is derived by the following Equation 8 using a positive correction coefficient C and the reactivity standard value $D_{c2\_st}$:

[Equation 8]

$$Z'=Z-C(D_{c2}-D_{c2\_st}) \quad (8)$$

The determination unit 12 corrects the first duration $T_1$ using the reactivity $D_{c2}$ that is the driving characteristic. Specifically, the corrected first duration $T'_1$ is derived by the following Equation 9 using a positive correction coefficient D and the reactivity standard value $D_{c2\_st}$:

[Equation 9]

$$T'_1=T_1-D(D_{c2}-D_{c2\_st}) \quad (9)$$

The determination unit 12 corrects the second duration $T_2$ using the reactivity $D_{c2}$ that is the driving characteristic. Specifically, the corrected second duration $T'_2$ is derived by the following Equation 10 using a positive correction coefficient E and the reactivity standard value $D_{c2\_st}$:

[Equation 10]

$$T'_2=T_2-E(D_{c2}-D_{c2\_st}) \quad (10)$$

Each of the corrections stated above is performed such that the corrected value becomes smaller as the user has higher cooperativeness and reactivity as driving characteristics. The derivation equation is not limited to the equation stated above, as long as the same tendency can be corrected. In the correction algorithm stated above, if the cooperativeness and the reactivity are the same as the standard values, the values do not change before or after the correction, and therefore the basic threshold corresponding to the standard value may be set.

(Step S208): The determination unit 12 determines whether a state in which the speed of the host vehicle is higher than the corrected vehicle speed X' or the corrected vehicle speed Y' continues for the corrected first duration $T'_1$ or more. If the determination result is positive, the process proceeds to step S210, and if the determination result is negative, the process proceeds to step S209.

(Step S209): The determination unit 12 determines whether a state in which the lane deviation amount of the host vehicle is higher than the corrected lane deviation amount Z' continues for the corrected second duration $T'_2$ or more. If the determination result is positive, the process proceeds to step S210, and if the determination result is negative, the process proceeds to step S201.

(Step S210): The determination unit 12 determines that the driving operation of the user is a driving operation falling outside the driving characteristics. The determination process ends.

The actual values such as maps, weighting coefficients, basic thresholds, correction coefficients, and standard values used in the driving characteristics derivation process and the determination process are set such that it is determined that the driving operation falls outside the driving characteristics, regardless of the driving characteristics of the user, by, for example, the statistical process based on the results of measurements or tests made on diverse subjects, and thus it can be detected that the user has lost the concentration required for driving.

Further, in the determination method stated above, the threshold is corrected such that it is easier to determine whether the driving operation falls outside the driving characteristics as the cooperativeness and the reactivity become higher. Accordingly, a state in which the user's concentration is lower than usual can be determined more accurately.

The method of deriving the driving characteristics and the method of determination, which are described above, are merely examples, and may be appropriately changed or omitted. For example, the static parameters, the dynamic parameters, and combinations thereof used for deriving the driving characteristics may be adopted in a manner other than those described above as long as they are useful.

Inhibition Plan Process

Figure 5:
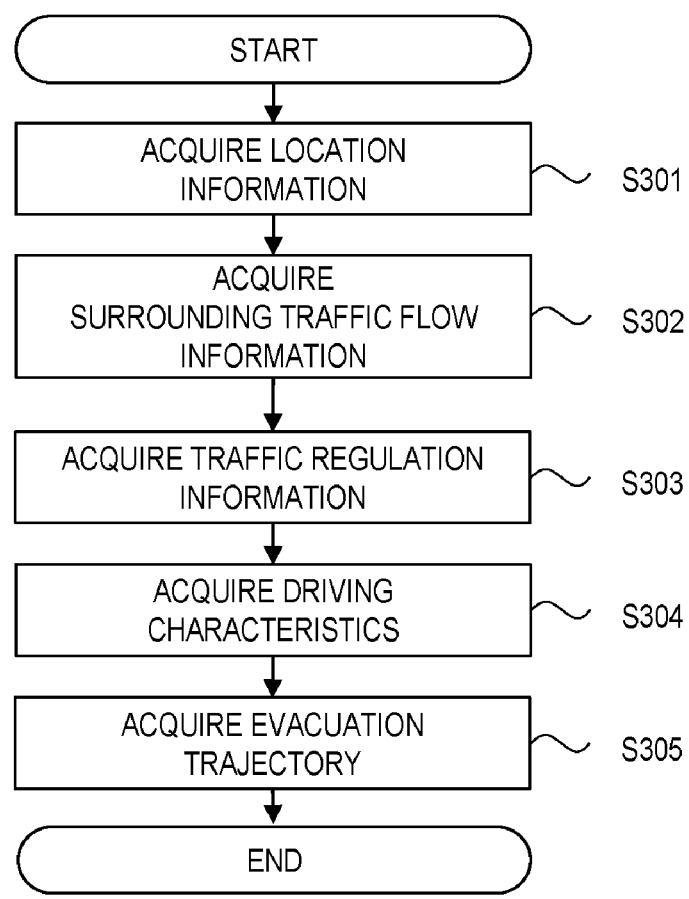
FIG. 5 is a flowchart illustrating an inhibition plan process according to the embodiment of the present disclosure.

This process is a process executed by the inhibition unit 13 to plan evacuation travel for inhibiting travel based on the driving operation falling outside the driving characteristics. The process will be described with reference to the flowchart shown in FIG. 5. This process is executed when it is determined in the determination process described above that the driving operation falls outside the driving characteristics. A function of executing this process may be implemented in, for example, the central ECU 100 shown in FIG. 2.

(Steps S301 to S304): Similar to steps S201 to S203 and S205 of the determination process stated above, the inhibition unit 13 acquires the location information of the host vehicle, the surrounding traffic flow information, the traffic regulation information, and the vehicle information.

(Step S305): The inhibition unit 13 derives an evacuation trajectory. That is, the inhibition unit 13 selects an evacuation area such as a shoulder near the location of the host vehicle based on, for example, the map information stored by the navigation system, and the information acquired from a camera or the like, from among the sensors 40. Then, the evacuation trajectory representing, for example, a travel route or traveling speed, which is for safely traveling from the location of the host vehicle to the selected evacuation area, is derived based on the surrounding traffic flow information and the traffic regulation information. The process is completed.

Inhibition Execution Process

Figure 6:
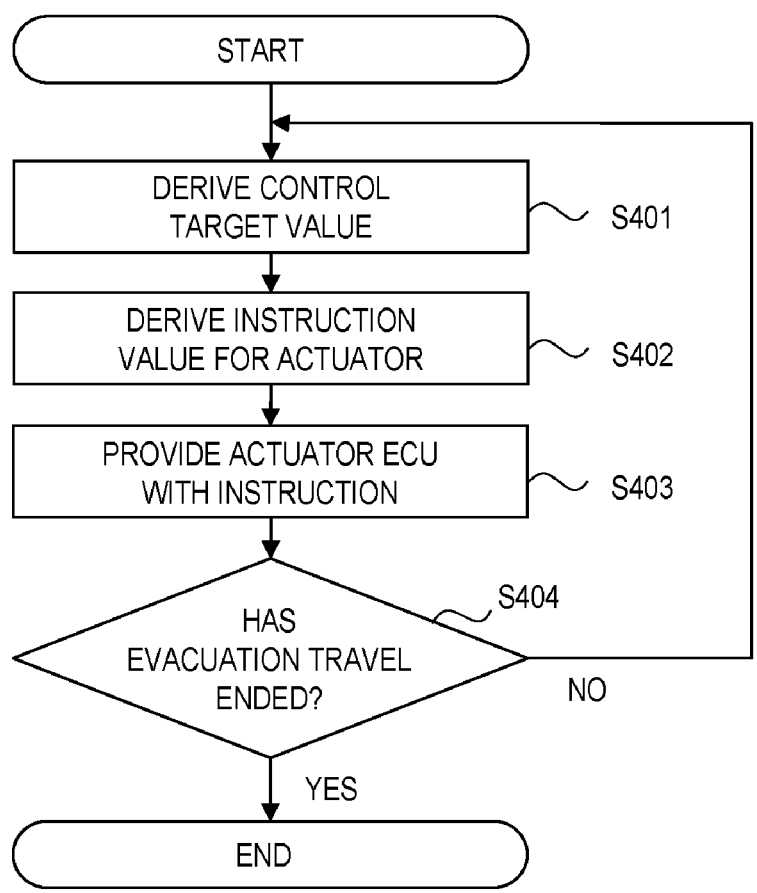
FIG. 6 is a flowchart illustrating an inhibition execution process according to the embodiment of the present disclosure.

This process is a process executed by the inhibition unit 13 to execute the evacuation travel. The process will be described with reference to the flowchart shown in FIG. 6. This process is executed after the inhibition plan process stated above. A function of executing this process may be implemented in, for example, the manager ECU 150 shown in FIG. 2. When the manager ECU 150 acquires the instruction based on the evacuation trajectory from the central ECU 100, the manager ECU 150 executes the process described below according to the acquired instruction. Since a high priority is given to the instruction for the evacuation travel, in the arbitration of the manager ECU 150 stated above, it is basically determined to control the actuator 70 according to this instruction. However, for example, in a case where the application ECU 50 that executes a function of collision avoidance detects a person jumping out in front of the vehicle, and the manager ECU 150 obtains a stop instruction as an instruction having a higher priority from the application ECU 50, the stop instruction is activated.

(Step S401): The inhibition unit 13 derives control target values such as the acceleration or deceleration of the vehicle as well as the yaw rate, based on the evacuation trajectory.

(Step S402): The inhibition unit 13 derives an instruction value of the control target value for each actuator 70. For example, a driving force (=acceleration×vehicle weight) for generating the acceleration of the control target is achieved by the engine and the electronic controlled transmission (ECT). The inhibition unit 13 derives the engine speed and gear ratio of the ECT such that the engine speed and load fall within a suitable combustion range while achieving such a driving force. For example, the gear ratio of the ECT can be derived based on a map in which the gear ratio is associated in advance with the set of the engine speed and the driving force.

Further, for example, the braking force for generating the deceleration of the control target is achieved by the engine brake generation torque of the engine, the ECT, and the brake. The inhibition unit 13 derives, for example, the gear ratio of the ECT based on a map in which the gear ratio is associated in advance with the set of the engine speed and the engine brake generation torque. In a case where the braking force is insufficient to generate the deceleration of the control target by the engine and the ECT, the inhibition unit 13 derives a control amount of the brake required to generate the braking force to compensate the insufficient force.

Further, the yaw rate of the control target, is implemented by the power steering device. The inhibition unit 13 derives a steering angle corresponding to the yaw rate.

(Step S403): The inhibition unit 13 issues, to the actuator ECU 60 that controls each actuator 70, an instruction value for each actuator 70 obtained in step S402. Each actuator ECU 60 controls each actuator 70 based on the instruction value.

(Step S404): The inhibition unit 13 determines whether the evacuation travel based on the evacuation trajectory has ended. In a case where it is determined that the evacuation travel has ended, the inhibition execution process ends, and when it is determined that the evacuation travel has not ended, the process proceeds to step S401.

In the inhibition plan process and the inhibition execution process, stated above, the evacuation trajectory may be updated at any time based on the information from the sensors 40 such as a camera, or the latest surrounding traffic flow.

Advantageous Effects

In the present embodiment, the driving characteristics of the user are derived, and it is determined whether a driving operation falls outside the driving characteristics of the user based on the driving characteristics and the traveling state of the vehicle due to the driving operation of the user. Consequently, it is possible to provide highly accurate determinations that reflect individual differences. In particular, the better the driving characteristics of the user, the easier it is to determine that the driving operation falls outside the driving characteristics. Accordingly, a state in which the user's concentration is lower than usual can be detected more accurately.

Further, in a case where a driving operation falls outside the driving characteristics, it is possible to perform the process that inhibits traveling based on a driving operation that actually falls outside the driving characteristics, such as evacuation travel.

The present disclosure relates to a driving assist method executed by, for example, the driving assist device including a processor and a memory, a driving assist program, a computer-readable non-transitory storage medium storing the driving assist program, and a vehicle equipped with such a driving assist device, as well as the driving assist device of the vehicle.

The present disclosure is useful for a driving assist device mounted on, for example, a vehicle.

What is claimed is:

1. A driving assist device mounted on a vehicle, the driving assist device comprising:
   a derivation unit configured to derive driving characteristics of a user who drives the vehicle;
   a determination unit configured to determine, based on the driving characteristics, whether a driving operation by the user corresponds to a driving operation that falls outside the driving characteristics; and
   an inhibition unit configured to perform, in a case where the determination unit determines that the driving operation by the user corresponds to the driving operation that falls outside the driving characteristics, control for inhibiting traveling based on the driving operation by the user,
   wherein the derivation unit is configured to derive the driving characteristics based on at least a cooperativeness of the vehicle with surrounding traffic flow, and a reactivity of the vehicle to the surrounding traffic flow, based on the driving operation by the user.

2. The driving assist device according to claim 1, wherein the derivation unit is configured to derive the driving characteristics based on a dynamic parameter depending on the driving operation of the user, and a static parameter not depending on the driving operation of the user.

3. The driving assist device according to claim 1, wherein the derivation unit is configured to derive the driving characteristics based on at least a time period from when a situation in which a state of the vehicle needs to be changed occurs to when the user performs a driving operation for changing the state of the vehicle.

4. The driving assist device according to claim 1, wherein the derivation unit is configured to calculate the reactivity of the vehicle based on at least one of age and driving history of the user.

5. The driving assist device according to claim 1, wherein the inhibition unit is configured to perform control for causing the vehicle to travel to an evacuation location regardless of the driving operation of the user, as the control for inhibiting the traveling by the driving operation of the user.

6. The driving assist device according to claim 1, wherein the cooperativeness of the vehicle is calculated based on at least a degree of similarity between a traveling state of the vehicle and a driving state of the surrounding traffic flow.

7. The driving assist device according to claim 6, wherein the degree of similarity is a correlation coefficient between a speed of the vehicle and a speed of the surrounding traffic flow.

8. A driving assist method executed by a driving assist device mounted on a vehicle, the driving assist method comprising:
   deriving driving characteristics of a user who drives the vehicle;
   determining, based on the driving characteristics, whether a driving operation by the user corresponds to a driving operation that falls outside the driving characteristics; and performing, in a case where it is determined that the driving operation by the user corresponds to the driving operation that falls outside the driving characteristics, control for inhibiting traveling based on the driving operation by the user, wherein the derivation unit is configured to derive the driving characteristics based on a cooperativeness of the vehicle with surrounding traffic flow, and a reactivity of the vehicle to the surrounding traffic flow, based on the driving operation by the user.

9. The driving assist method according to claim 8, wherein the cooperativeness of the vehicle is calculated based on at least a degree of similarity between a traveling state of the vehicle and a driving state of the surrounding traffic flow.

10. The driving assist method according to claim 9, wherein the degree of similarity is a correlation coefficient between a speed of the vehicle and a speed of the surrounding traffic flow.

11. A non-transitory computer-readable medium including a driving assist program that causes a driving assist device mounted on a vehicle to perform a method comprising:

deriving driving characteristics of a user who drives the vehicle;

determining, based on the driving characteristics, whether a driving operation by the user corresponds to a driving operation that falls outside the driving characteristics; and performing, in a case where it is determined that the driving operation by the user corresponds to the driving operation that falls outside the driving characteristics, control for inhibiting traveling based on the driving operation by the user, wherein the derivation unit is configured to derive the driving characteristics based on a cooperativeness of the vehicle with surrounding traffic flow, and a reactivity of the vehicle to the surrounding traffic flow, based on the driving operation by the user.

12. The non-transitory computer-readable medium according to claim 11, wherein the cooperativeness of the vehicle is calculated based on at least a degree of similarity between a traveling state of the vehicle and a driving state of the surrounding traffic flow.

13. The non-transitory computer-readable medium according to claim 12, wherein the degree of similarity is a correlation coefficient between a speed of the vehicle and a speed of the surrounding traffic flow.

* * * * *